United States Patent [19]
Iwamatsu

[11] Patent Number: 6,034,564
[45] Date of Patent: Mar. 7, 2000

[54] DEMODULATOR USING QUASI-SYNCHRONOUS DETECTION TO DEMODULATE MODULATED QUADRATURE INPUT SIGNALS

[75] Inventor: Takanori Iwamatsu, Tochigi, Japan

[73] Assignee: Fujitsu Limited, Kawasaki, Japan

[21] Appl. No.: 08/961,201

[22] Filed: Oct. 30, 1997

[30] Foreign Application Priority Data

May 2, 1997 [JP] Japan .................................. 9-114635

[51] Int. Cl.⁷ .................................................. H04L 27/38
[52] U.S. Cl. .......................... 329/306; 375/344; 375/232; 375/235; 375/324; 329/304
[58] Field of Search .................................... 329/306, 304; 375/232, 235, 324, 344

*Primary Examiner*—Arnold Kinkead
*Attorney, Agent, or Firm*—Staas & Halsey LLP

[57] ABSTRACT

A demodulator using quasi-synchronous detection to demodulate modulated quadrature input signals. The demodulator has a quasi-synchronous detector detecting a modulated quadrature input signal using an output signal of a fixed frequency from a local oscillator, an equalizer equalizing a quadrature channel signal which is a digital signal converted from the detected quadrature signal from the quasi-synchronous detector, and a phase rotator rotating the phase of the equalized quadrature channel signal output from the equalizer. Furthermore, the demodulator has an equalization control unit to generate a tap factor for the equalizer from the quadrature channel signal equalized by the equalizer, using a signal having substantially the same phase as the input-output signals of the equalizer.

21 Claims, 16 Drawing Sheets

DEMODULATOR USING QUASI-SYNCHRONOUS DETECTION TO DEMODULATE MODULATED QUADRATURE INPUT SIGNALS

CROSS-REFERENCE TO RELATED APPLICATION

This application is based upon and claims priority of Japanese patent application No. 9-114635 filed on May 2, 1997, the contents being incorporated herein by reference.

BACKGROUND OF THE INVENTION

1. Field of the Invention

The present invention relates to a demodulator using quasi-synchronous detection to demodulate modulated quadrature input signals. More particularly, the present invention relates to a demodulator having a quasi-synchronous detector to detect a modulated quadrature input signal using an output signal of a fixed frequency from a local oscillator, an equalizer to equalize a quadrature channel signal which is a digital signal converted from the detected quadrature signal output from the quasi-synchronous detector, and a phase rotator to rotate the phase of the quadrature channel signal output from the equalizer.

The demodulator that demodulates modulated quadrature signals has a configuration comprising numerous digital processing sections. Consequently, the configuration for quasi-synchronous detection is generalized. To reduce the equipment costs on the transmitting side, a local oscillator of relatively low-cost configuration is used. However, the oscillating frequency of this oscillator fluctuates. Therefore, the invention relates to a demodulator for use on the receiving side that follows the fluctuating frequency and modulates received signals without complicating the configuration and generating increased costs.

2. Description of the Related Art

FIG. 1 is a schematic block diagram of a prior art demodulator regenerating an analog carrier. In this figure, the demodulator has an input terminal 101; a synchronous detector 102 for quadrature synchronous detection; a local voltage controlled oscillator (LVCO) 103; band-pass filters 104 and 105 for shaping roll-off waveforms; A/D converters 106 and 107; a constant-voltage clock oscillator (CVCO) 108; a transversal equalizer 109; a controller 110; low-pass filters 111 and 112; and output terminals 113 and 114 for channels I and Q that are perpendicular to one another.

To output the detected signals of quadrature channels I and Q, the synchronous detector 102 detects modulated quadrature signals input into the input terminal 101 synchronously using output signals from the local voltage controlled oscillator 103. The detected output signals are input into the A/D converters 106, 107 via the band-pass filters 104, 105. The signals are sampled using clock pulses from the constant-voltage clock oscillator 108, converted into digital signals, and input into the transversal type automatic equalizer 109. The equalization-evaluated I-channel and Q-channel output signals are output to the post-stage devices from the output terminals 113, 114.

Based on the equalization-evaluated output signals (baseband signals), the controller 110 calculates the phase difference between the carrier of a modulated A quadrature signal and the regenerated carrier. The controller 110 then applies a control voltage according to the calculated phase difference to the local voltage controlled oscillator 103 through the low-pass filter 111. The controller 110 synchronizes the regenerated carrier phase of a signal output from the local voltage controlled oscillator 103 with the carrier phase of a modulated quadrature signal input from the input terminal 101. The controller 110 applies a control voltage to the constant-voltage clock oscillator 108 through the low-pass filter 112 to synchronize the phase of the clock signal input into the A/D converters 106, 107 with the symbol phase.

In the demodulator regenerating an analog carrier, the delay time is increased by containing band-pass filters 104, 105, A/D converters 106, 107, an equalizer 109, a controller 110, and a low-pass filter 111 in the generation loop. As a result, it becomes difficult to follow the fluctuating carrier phase of a modulated quadrature signal at high speeds.

FIG. 2 is a schematic block diagram of a prior art demodulator regenerating a digital carrier. In this figure, the demodulator has an input terminal 121; a quasi-synchronous detector 122; a local oscillator 123; band-pass filters 124 and 125; A/D converters 126 and 127; a constant-voltage clock oscillator 128 for clock pulse output; a transversal equalizer 129; a phase rotator 130; a constant-voltage phase control signal oscillator 131; a controller 132; low-pass filters 133 and 134; and output terminals 135 and 136.

The local oscillator 123 has a preset oscillation frequency for oscillating a signal having the same frequency as the carrier frequency of the modulated quadrature signal (intermediate frequency) input from the input terminal 121. Therefore, if the quasi-synchronous detector 122 is set so that it corresponds with the synchronous detector 102 shown in FIG. 1, the phase and frequency of the regenerated carrier is deviated from the phase of the carrier of the modulated quadrature signals. In accordance with this deviation, the phases of I-channel and Q-channel detection output signals are rotated.

The I-channel and Q-channel output signals from the quasi-synchronous detector 122 are input into the A/D converters 126, 127 through the band-pass filters 124 and 125. These signals are sampled using the clock pulses from the constant-voltage clock oscillator 128 to be converted into digital I-channel and Q-channel signals. If the quadrature signals modulated by quadrature amplitude modulation ("QAM") are input into the input terminal 121, the A/D converters 126, 127 sample the I-channel and Q-channel signals by using the clock pulses to convert them into 8-bit digital signals.

If the digital I-channel and Q-channel signals are input into the phase rotator 130, the phase rotator 130 multiplies the input signals by phase control signals from the constant-voltage phase control signal oscillator 131 to rotate their phases. Consequently, the I-channel and Q-channel signals of quasi-synchronous detection are controlled to keep almost the same phases as those of synchronous detection. The I-channel and Q-channel signals output from the phase rotator 130 are equalization-evaluated by the equalizer 129, corresponding to the equalizer 109 of FIG. 1. Based on the equalization-evaluated output signals, control signals for the constant-voltage clock oscillator 128 and constant-voltage phase control signal oscillator 131 are output by the controller 132.

The controller 132 outputs control signals on the basis of the polarity bits of the demodulated quadrature-channel (I-channel and Q-channel) output signals from the output terminals 135, 136 and the error signals. In the aforementioned 8-bit configuration, the highest-order bit of a Q-channel or I-channel signal is polarity bit D, the second bit is an effective data bit, and third bit is error signal bit E.

The controller 132 then uses the multiplication output or exclusive OR output of I-channel polarity bit D and Q-channel error signal bit E as a control signal. Likewise, the multiplication output or exclusive OR output of Q-channel polarity bit D and I-channel error signal bit E may also be used as a control signal.

FIG. 3 is a schematic diagram further illustrating the details of the phase rotator 130 and the constant-voltage phase control signal oscillator 131 shown in FIG. 2. In this figure, phase rotator 130 includes multipliers 141 through 144 and adders 145 and 146, and oscillator 131 includes delay elements (T) 151 and 152; an adder 153; and a memory device 154, usually read-only memory (ROM), where sin θ and cos θ are stored for an accumulated value.

The controller 132 in FIG. 2 inputs a control signal to the phase control signal oscillator 131 through the low-pass filter 134. This signal is input into the adder 153 through the delay element 151. The output from the delay element 151 is added to the previous output through the delay element 152 to determine an address in the memory device 154.

With the accumulated value of the control signals as a memory address, sin θ and cos θ are read from the memory device 154. The sin θ is input into the multipliers 142, 143 and the cos θ into the other multipliers 141, 144.

If the input I-channel and Q-channel signals of the phase rotator 130 are I' and Q' and the output I-channel and Q-channel signals from the adders 145, 146 are I" and Q", the following equations apply:

$$I''=I' \cos \theta - Q' \sin \theta \quad (1)$$

$$Q''=I' \sin \theta + Q' \cos \theta \quad (2)$$

When the frequency or phase of an output signal from the local oscillator 123 in FIG. 2 does not match that of the carrier of a modulated quadrature input signal, the phases of the I-channel and Q-channel signals from the quasi-synchronous detector 122 may change. Even under these conditions, the phase rotator 130 can rotate the I-channel and Q-channel signal phases to achieve the specified phases. Consequently, the demodulator of FIG. 2 can output quadrature channel signals as if the modulated quadrature input signals have been detected synchronously, using the regenerated carriers in phase synchronism with those of the modulated quadrature input signals.

FIG. 4 is a schematic diagram further illustrating the details of the transversal equalizer 129 shown in FIG. 2. In this figure, elements 129-1 and 129-2 are equalizers for channels I and Q. An equalizer 129-1 includes tapped delay circuits 141 and 144 consisting of flip-flops, multipliers 142 and 145 and adders 143, 146 and 147. (CI –n . . . CI o . . . CI n) and (CIX –n . . . CIX o . . . CIX n) represent the tap factors input from the controller 132 as further depicted in FIG. 5.

A common-mode filter consists of the tapped delay circuit 141, multiplier 142, and adder 143. A quadrature filter consists of the tapped delay circuit 144, multiplier 145, and adder 146. Since the equalizers 129-1 and 129-2 have the same configuration, details of the channel-Q equalizer 129-2 are omitted in FIG. 4. The equalizers for channels Q and I reduce intersymbol interference by the common-mode filter and eliminate components leaking from channel Q into channel I (or in the opposite direction) by the quadrature filter.

FIG. 5 is a schematic diagram further illustrating the details of the controller 132 shown in FIG. 2. In this figure, elements 132-1 and 132-2 are I-channel and Q-channel controllers. The I-channel controller 132-1 consists of flip-flops (FF) 151 and 157 multiplier 152 and 156, integrators (∫) 153 and 155, and n-stage shift register ("SR") 154. DI and DQ represent I-channel and Q-channel polarity bits, while EI and EQ represent I-channel and Q-channel error signals. Since the controllers 132-1, 132-2 have the same configuration, the details of channel-Q controller 132-2 are omitted in FIG. 5.

The flip-flops 151, 157 are connected in 2n stages each by cascade connection. Either input terminal of each multiplier 152, 156 is connected to each tap and the shift register 154 to the other input terminal. I-channel polarity bit DI is input into a flip-flop 151 and Q-channel polarity bit DQ into the other flip-flop 157. I-channel error signal EI is input into the shift register 154.

The integrator 153 integrates (averages) multiplied output signals from a multiplier 152 and outputs the tap factors (CI –n . . . CIo . . . CI n) for the common-mode filter. The integrator 155 integrates (averages) multiplied output signals from a multiplier 156 and outputs the tap factors (CIX –n . . . CIX o . . . CIX n) for the quadrature filter.

FIGS. 3 and 5 illustrate the configuration and function of each section in the conventional demodulator shown in FIG. 2 which regenerates a digital carrier. The configurations and functions of such a demodulator are also described in Japanese Patent Publication Nos. 6-85864, 6-90265, and 6-152676. For a system containing this kind of demodulator, a high-precision oscillator is recommended as a carrier oscillator for modulated quadrature signals on the transmission side. However, taking this course of action will incur high costs.

To reduce equipment costs, however, low-cost oscillators can be used, although precision is sacrificed to some extent. That is, these oscillators cause relatively large phase and frequency fluctuation of the carrier of a received modulated quadrature signal. For the transmission of dynamic images, high-speed transmission (several Mega bps or more) is required even when the data is compressed. If the carrier frequency displays relatively large fluctuations in high-speed transmission, the phase rotator 130 should be controlled so that it follows the fluctuations of the carrier phase and frequency.

The loop for controlling the phase rotator 130 contains an equalizer 129. Since this equalizer 129 has tapped delay circuits containing multistage flip-flops, the delay is relatively significant. This makes it difficult to control the phase rotator 130 at high speeds.

FIG. 6 is a schematic of a prior art demodulator of the type proposed to reduce delay in the loop for controlling the phase rotator. In this figure, the demodulator has an input terminal 161; a quasi-synchronous detector 162; a local oscillator 163; band-pass filters 164 and 165; A/D converters 166 and 167; a constant-voltage clock oscillator 168 for clock pulse output; a transversal equalizer 169; a phase rotator 170; a constant-voltage phase control signal oscillator 171; a controller 172; low-pass filters 173 and 174; and output terminals 175 and 176.

Compared to the demodulator shown in FIG. 2, the demodulator shown in FIG. 6 has equalizer 169 at the prior stage of phase rotator 170. Therefore, the loop for controlling the phase rotator does not contain the equalizer. By reducing the loop delay in this manner, the phase rotator can be controlled so that it follows the carrier phase and frequency fluctuations of modulated quadrature input signals at high speed.

FIG. 7 is a schematic view of another prior art demodulator. In this figure, the demodulator has an input terminal 181; a quasi-synchronous detector 182; a local oscillator 183; band-pass filters 184 and 185; A/D converters 186 and 187; a constant-voltage controlled clock oscillator 188; a forward-tap equalizer 189A; a backward-tap equalizer 189B; phase rotator 190; a constant-voltage phase control signal oscillator 191; a controller 192; low-pass filters 193 and 194; and output terminals 195 and 196.

The equalizer 169 in FIG. 6 for use in the demodulator of FIG. 7 is separated into the forward-tap equalizer 189A and backward-tap equalizer 189B and the phase rotator 190 is connected between them. For example, the forward-tap equalizer 189A is a forward type transversal equalizer and the backward-tap equalizer is a backward type equalizer 189B performing evaluation feedback.

The I-channel and Q-channel signals are equalized by the forward-tap equalizer 189A and controlled by the phase rotator 190 so that the I-channel and Q-channel signals are regulated to the normal demodulation phases. These signals are then equalization-evaluated by the backward-tap equalizer 189B. The backward-tap equalizer 189B causes a delay of about only one symbol. Even when the loop for controlling the phase rotator 190 contains the backward-tap equalizer 189B, high-speed follow-up control can be provided. This demodulator is also described in Japanese Patent Publication No. 7-66843.

The prior art demodulators shown in FIGS. 6 and 7 enable high-speed phase control by reducing the delays in the loops for controlling the respective phase rotators 170, 190. Unlike the prior art demodulators shown in FIGS. 1 and 2, however, this demodulator has the equalizer 169 or forward-tap equalizer 189A outside the phase control loop. Therefore, the phases of the input I-channel and Q-channel signals are rotating. In other words, the equalizer 169 or forward-tap equalizer 189A operate in the rotating coordinate system. Meanwhile, the controllers 172, 192 are inside the phase control loop and the phases of the input I-channel and Q-channel signals are not rotating. In other words, the controllers 172, 192 operate in the nonrotating coordinate system. Since control signals produced by a static coordinate system are not correct for the equalizers operating on the rotating coordinate system, control is unstable.

Phase-rotated I-channel and Q-channel signals are input into the controllers 172, 192 and tap factors to add to the equalizer 169 or forward-tap equalizer 189A are generated. Therefore, the tap factors are changed at every phase rotation control by the phase rotators 170, 190. Although the phase rotation can be controlled at high speeds so that it follows the carrier phase and frequency of the modulated quadrature input signal, the equalization processing at the prior stages of the phase rotators 170, 190 become unstable.

SUMMARY OF THE INVENTION

It is therefore an object of the present invention to provide a demodulator, using quasi-synchronous detection to demodulate modulated quadrature signals and having a quick and stable equalization operation at low costs.

It is a further object of the present invention to provide a demodulator stabilizing the equalization processing and making the demodulator compact.

According to the invention, objects of the invention are achieved by a demodulator for demodulating an input signal using quasi-synchronous detection, with the demodulator including a quasi-synchronous detector to detect a modulated quadrature input signal using an oscillated signal of a fixed frequency output from a local oscillator, an equalizer to equalize a quadrature channel signal which is a digital signal converted from the detected quadrature signal output from the quasi-synchronous detector, a phase rotator to rotate the phase of the equalized quadrature channel signal output from the equalizer and an equalization control unit to generate a tap factor for the equalizer from the quadrature channel signal equalized by the equalizer, using a signal having substantially the same phase as the input-output signals of the equalizer.

Further objects of the invention are achieved by a demodulator for demodulating an input signal using quasi-synchronous detection, with the demodulator including a quasi-synchronous detector to detect a modulated quadrature input signal using an oscillated signal of a fixed frequency output from a local oscillator, a forward-tap equalizer, having a tap group corresponding to the prestage of central taps, to equalize a quadrature channel signal which is a digital signal converted from the detected quadrature signal output from the quasi-synchronous detector, a phase rotator to rotate the phase of the equalized quadrature channel signal output from the forward-top equalizer, a backward-tap equalizer, having a tap group corresponding to a post-stage of central taps, to equalize the quadrature channel signals output from the phase rotator, an equalization control unit to generate a tap factor for the forward-tap equalizer from the quadrature channel signal equalized by the forward-tap equalizer, using a signal having substantially the same phase as the input-output signals of the forward-tap equalizer and a first equalization controller to receive a quadrature channel signal output from the backward-tap equalizer and to generate a tap factor for the backward-tap equalizer.

DESCRIPTION OF THE PREFERRED EMBODIMENTS

Figure 8:
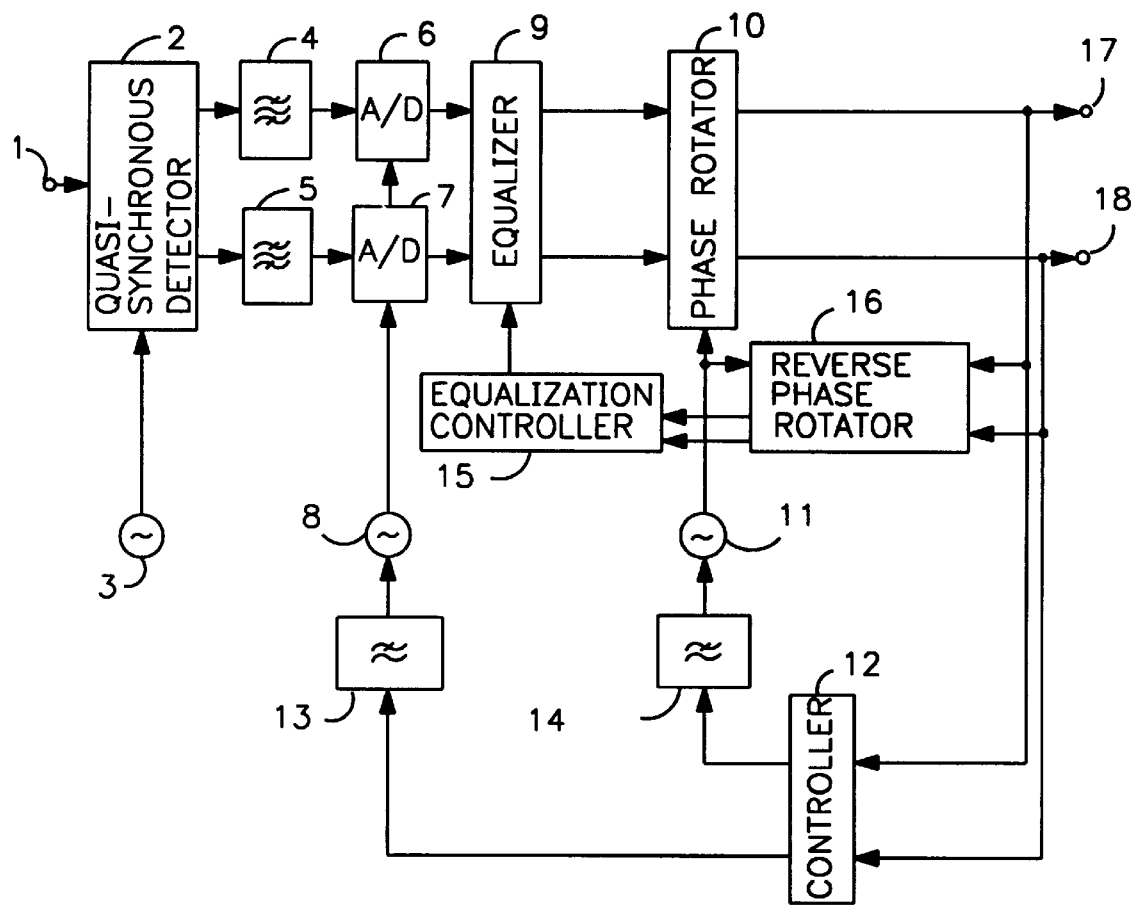
FIG. 8 is a schematic diagram of a demodulator according to a preferred embodiment of the invention.

FIG. 8 is a schematic diagram showing the structure of a demodulator according to a first preferred embodiment of the invention. In this figure, and as embodied herein, the demodulator includes: an input terminal 1, a quasi-synchronous detector 2, a local oscillator 3, band-pass filters 4 and 5, A/D converters 6 and 7, a constant-voltage clock oscillator 8, an equalizer 9, a phase rotator 10, a constant-voltage phase control signal oscillator 11, a controller 12, low-pass filters 13 and 14, an equalization controller 15, a reverse phase rotator 16, and output terminals 17 and 18.

Modulated quadrature signals (intermediate frequency) are input into the input terminal 1. The input signals are detected at the quasi-synchronous detector 2 using the local oscillation signals of a fixed frequency from the local oscillator 3. The detected quadrature channel signals are input, through the band-pass filters 4, 5, into A/D converters 6, 7. The converters 6,7 sample the signals in accordance with the clock signals from the constant-voltage clock oscillator 8 and convert them into digital signals. The digital signals are input into the transversal equalizer 9. The I-channel and Q-channel signals are equalized in accordance with tap factors from the equalization controller 15 and input into the phase rotator 10. The phases of I-channel and Q-channel signals are rotated at the phase rotator 10. The rotated I-channel and Q-channel signals are then sent from the output terminals 17, 18 to the post-stage devices.

Figure 6:
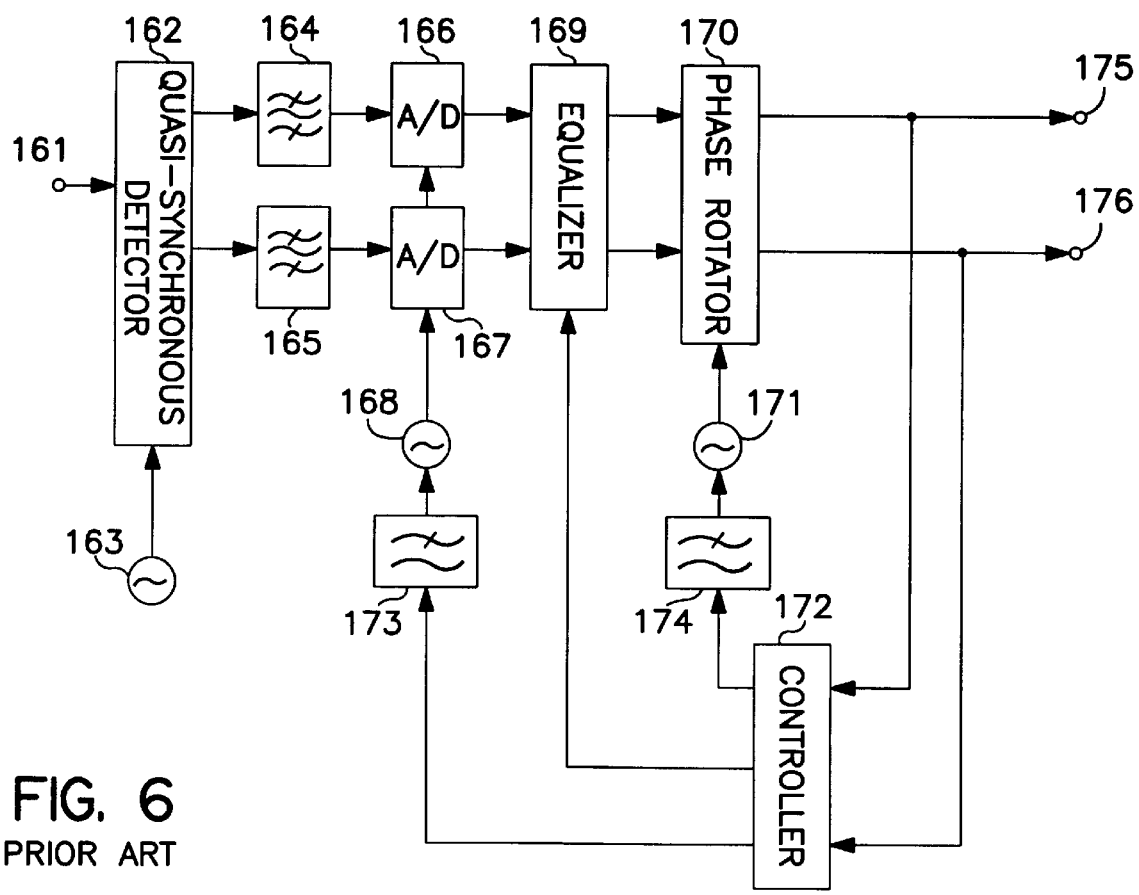
FIG. 6 is a schematic diagram of the another prior art demodulator.
Figure 7:
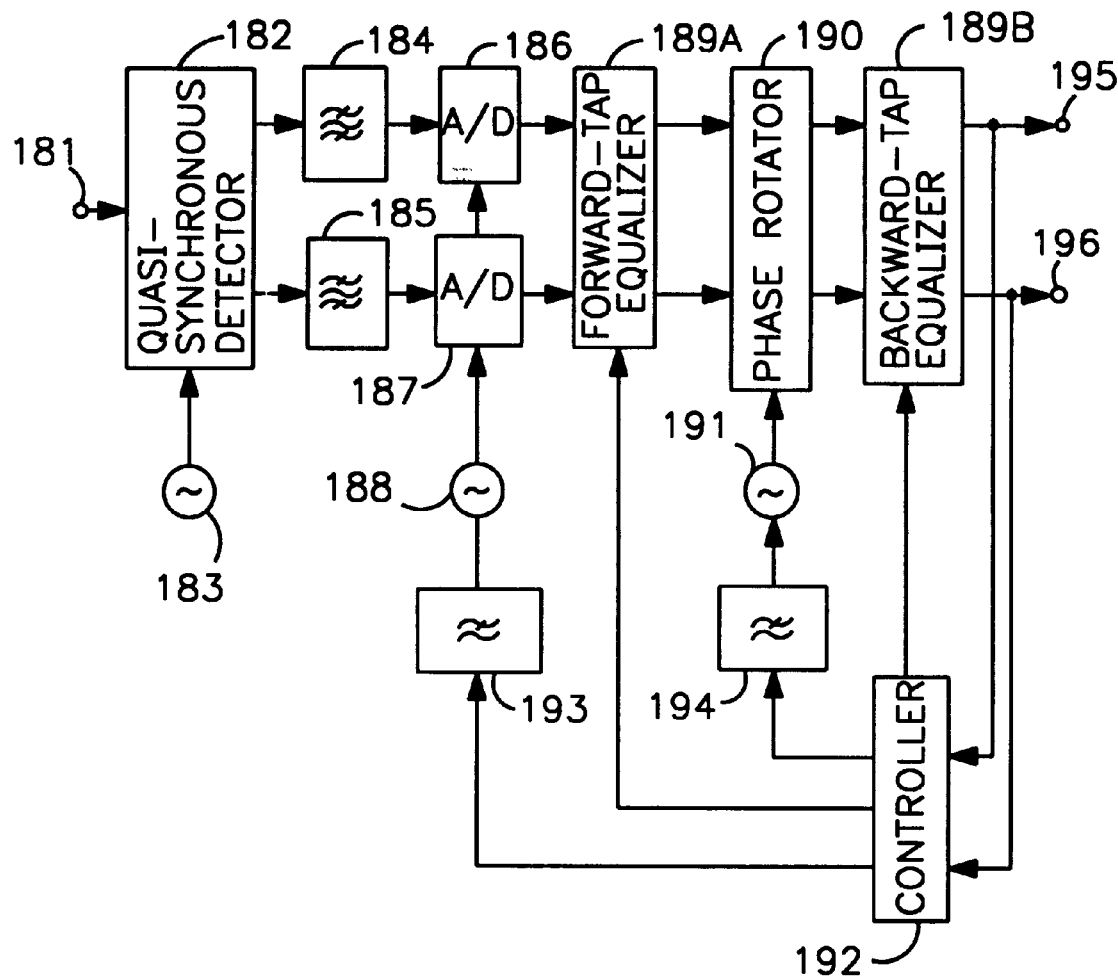
FIG. 7 is a schematic diagram of the another prior art demodulator.

This demodulator shown in FIG. 8 has a configuration similar to the demodulator of FIG. 6, except that the significant features of an equalization controller 15 and a reverse phase rotator 16 are incorporated therein. The equalization controller 15 has an equalization control function similar to one included in the controller 172 shown in FIG. 6 and calculates tap factors of the equalizer 9 from the polarity bits and error signals of I-channel and Q-channel signals. The I-channel and Q-channel input signals to the equalizer 9 and I-channel and Q-channel output signals from the phase rotator 10 have difference phases with each other.

The reverse phase rotator 16 rotates the phases of I-channel and Q-channel signals in reverse to the original status for input into the equalization controller 15. The equalizer 9 and equalization controller 15 equalize the signals in accordance with the I-channel and Q-channel signals whose phases are returned to the status prior to phase rotation by the phase rotator 10. This ensures a stable operation of the equalizer 10, even when the carrier phase and frequency of a modulated quadrature signal change.

Figure 1:
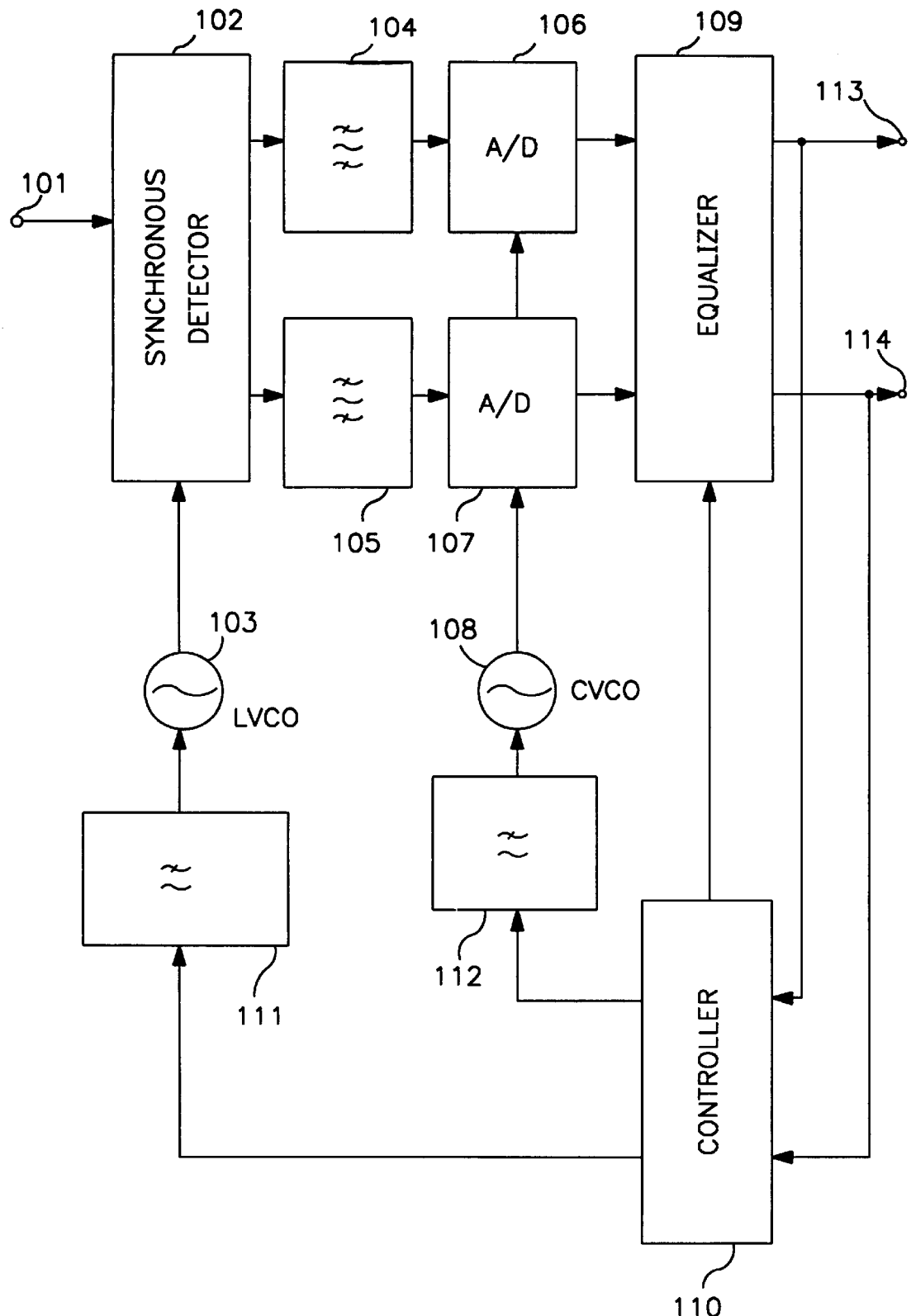
FIG. 1 is a schematic diagram of a prior art demodulator regenerating an analog carrier.
Figure 2:
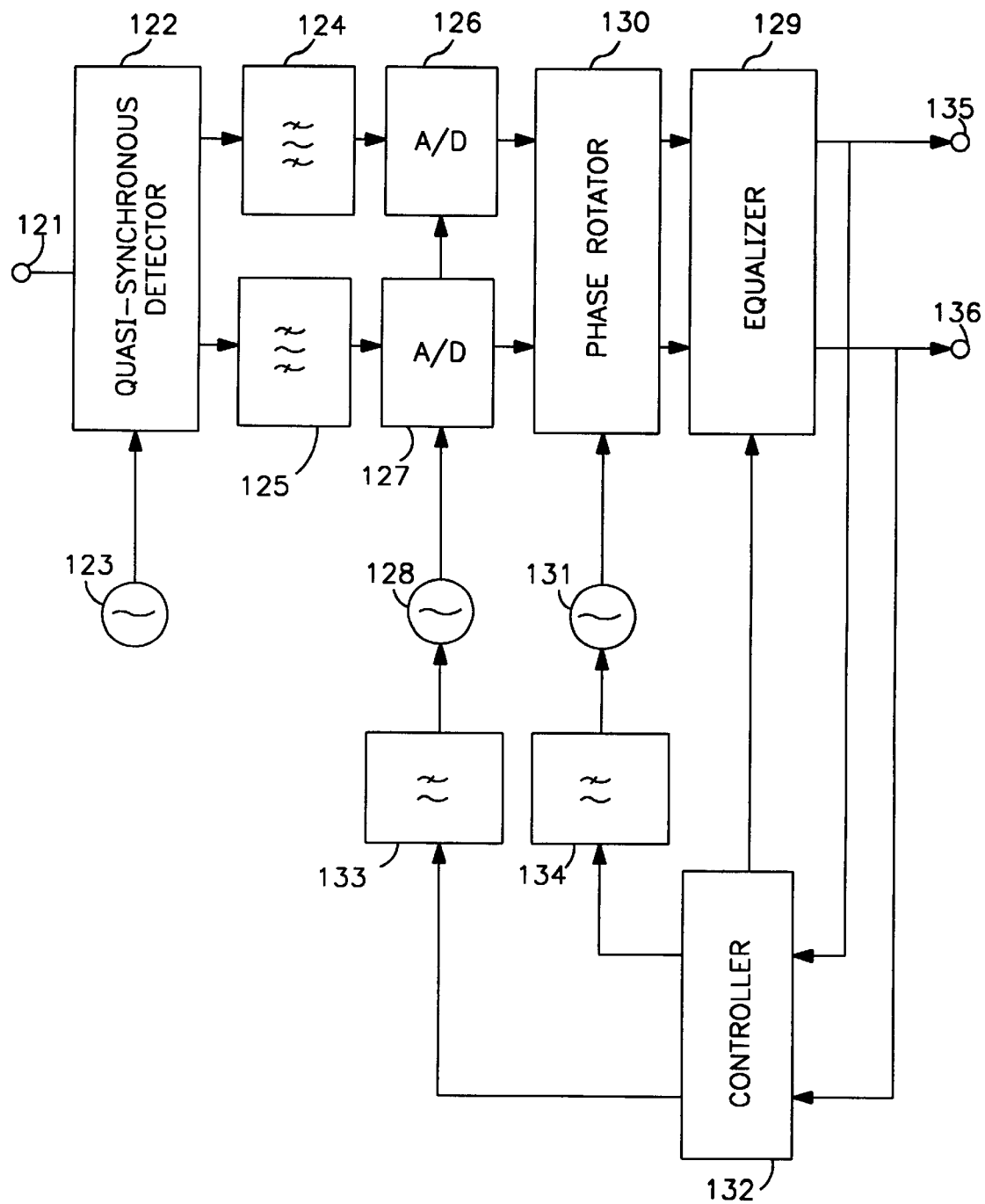
FIG. 2 is a schematic diagram of a prior art demodulator regenerating a digital carrier.
Figure 3:
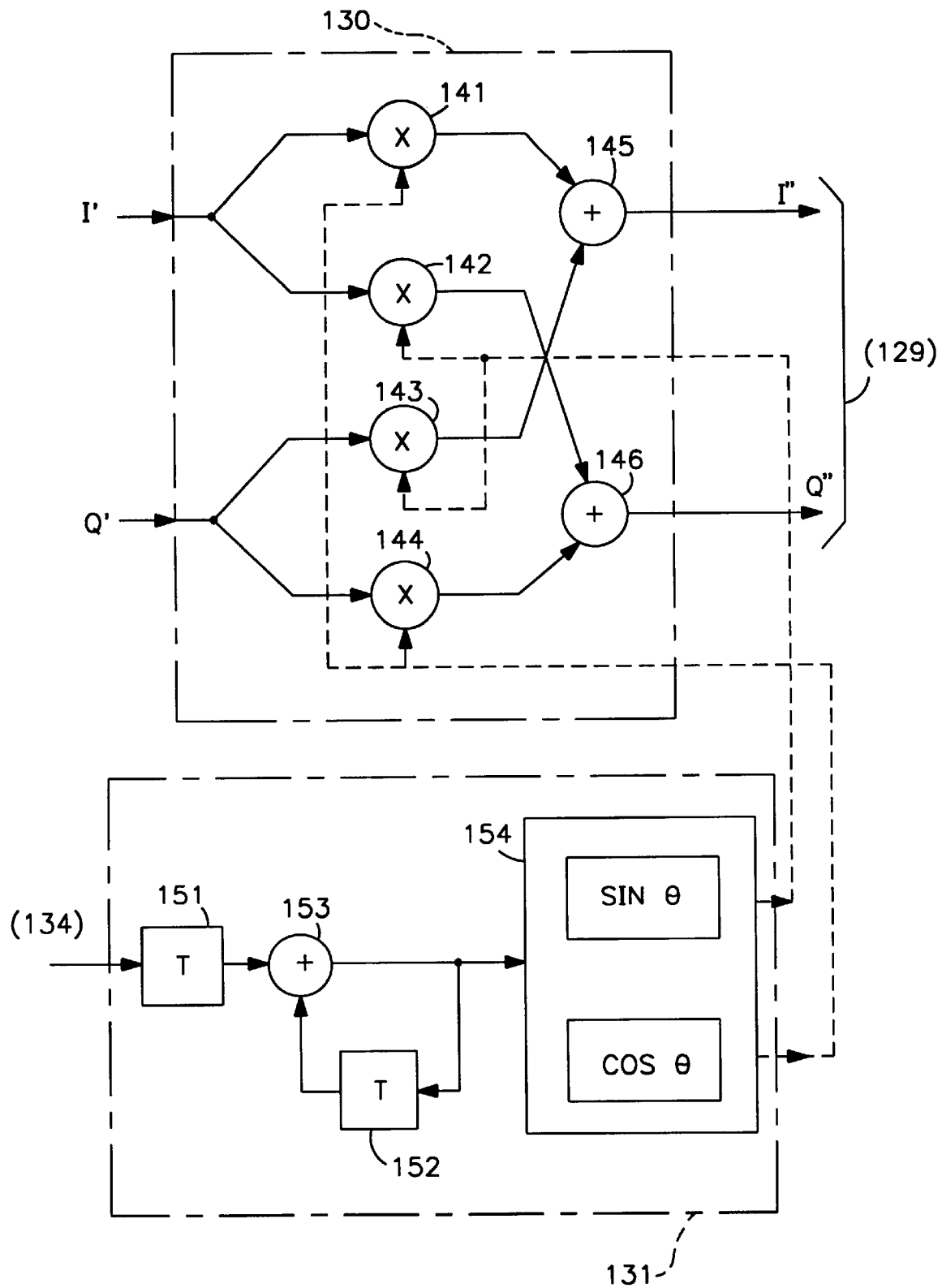
FIG. 3 is a schematic diagram of the phase rotator and control signal oscillator shown in FIG. 2.
Figure 4:
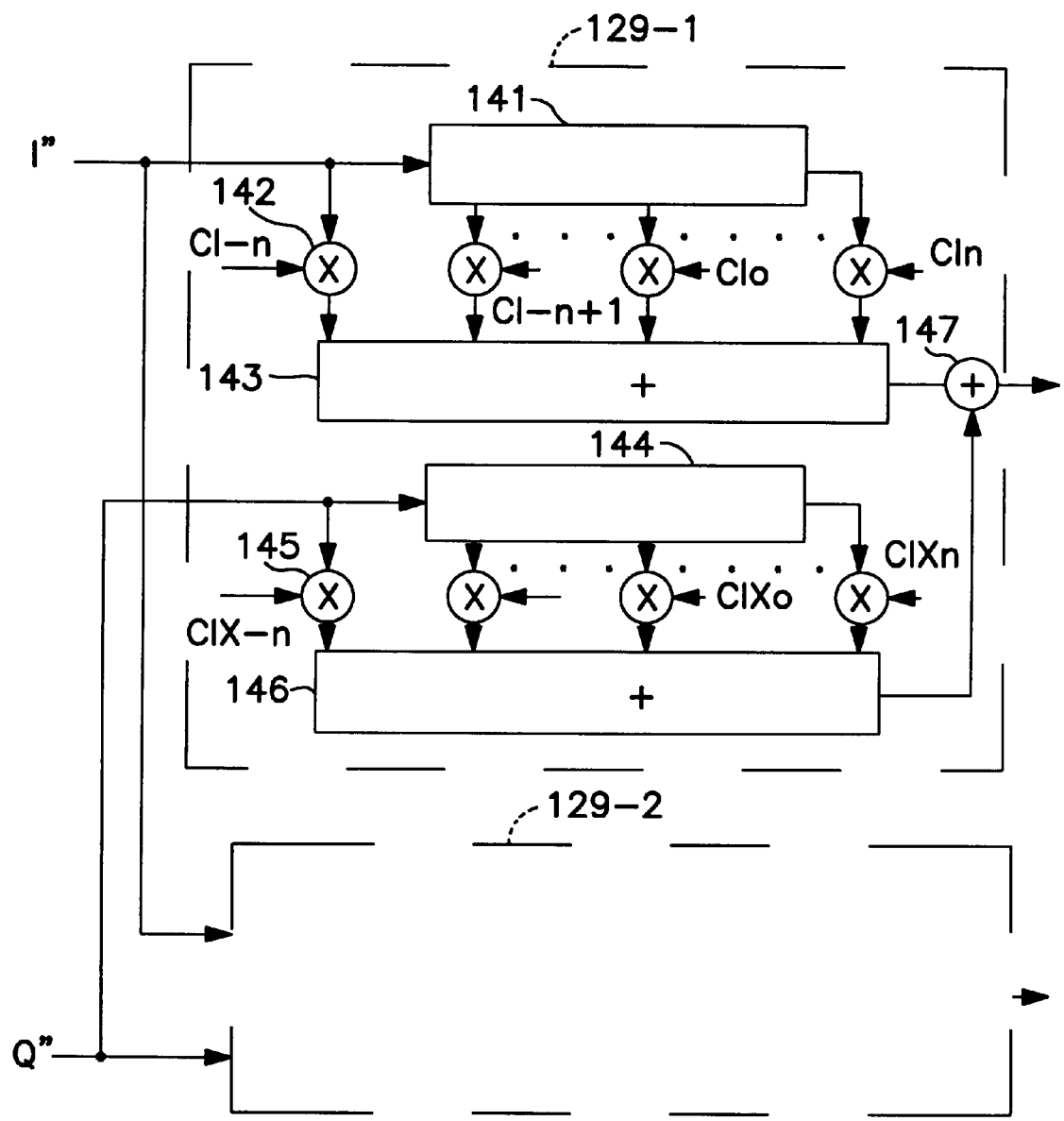
FIG. 4 is a schematic diagram of the transversal equalizer shown in FIG. 2.
Figure 5:
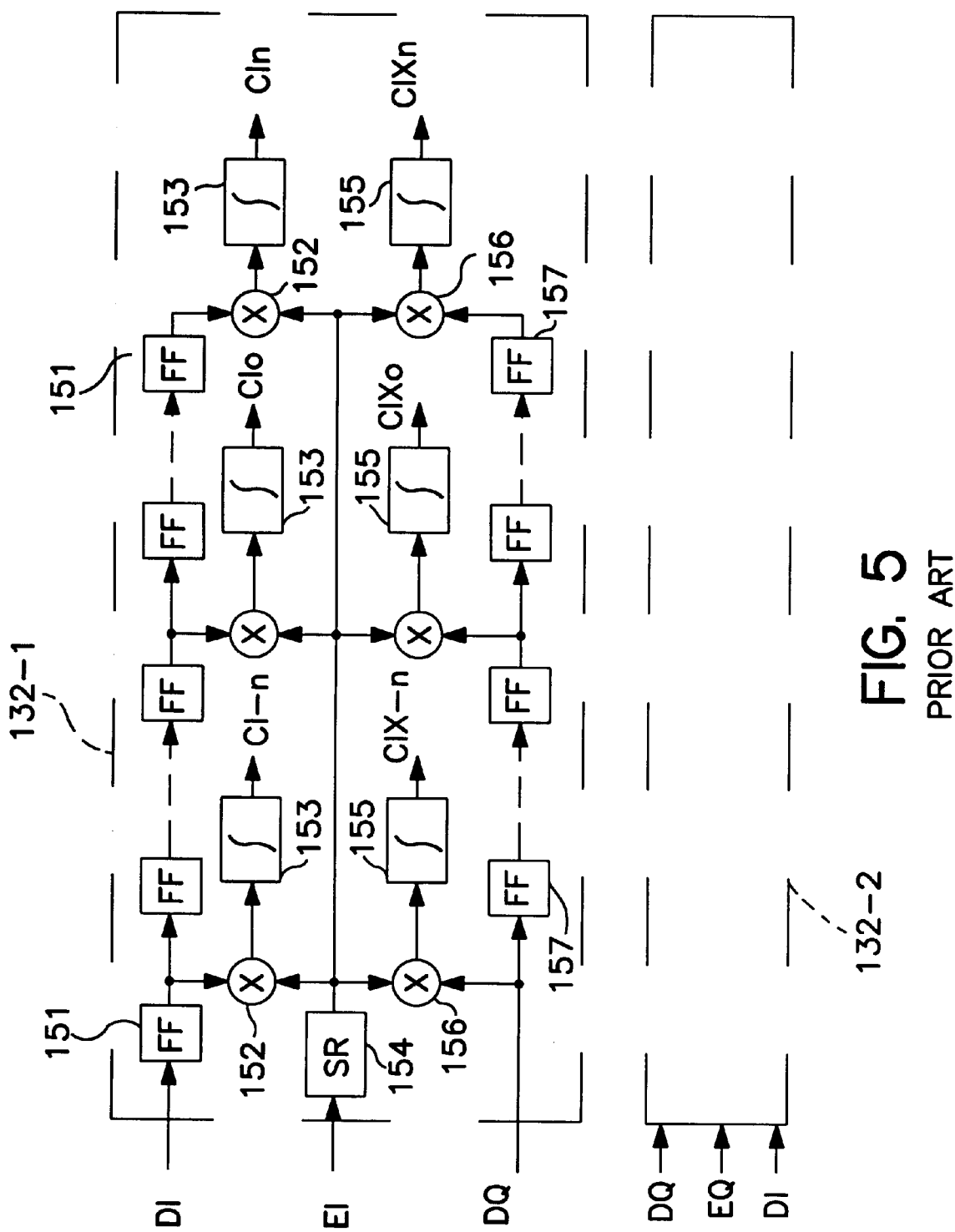
FIG. 5 is a schematic diagram of the controller shown in FIG. 2.
Figure 9:
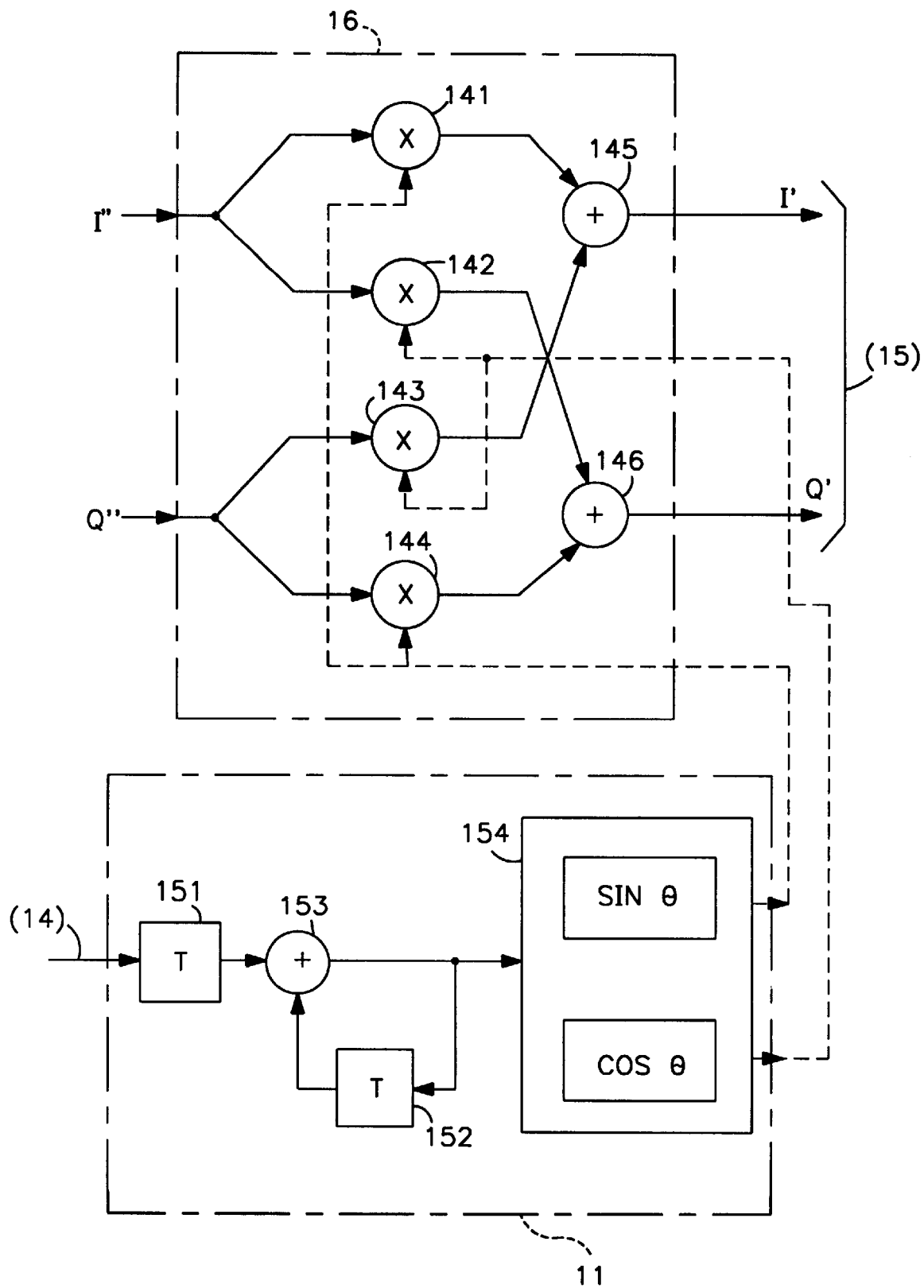
FIG. 9 is a schematic diagram of the reverse phase rotator and control signal oscillator shown in FIG. 8 according to a preferred embodiment of the present invention.

As embodied herein, the phase rotator 10 and constant-voltage phase control signal oscillator 11 can have configurations similar to those shown for the phase rotator and oscillator of FIG. 3. Moreover, the reverse phase rotator 16 can have a configuration similar to the phase rotator 10. The phase control signals (sin θ, cos θ) from the constant-voltage phase control signal oscillator 11, however, are input into a multiplier different from the one shown in FIG. 3 for a reverse operation from that of the phase rotator 130. FIG. 9 is a schematic diagram showing the configuration of the control signal oscillator 11 and the reverse phase rotator 16. Unlike the configuration shown in FIG. 3, the phase control signal of sin θ from the phase rotation control signal oscillator 11 is input into the multipliers 141, 144 and the control signal of cos θ is input into the other multipliers 142, 143.

Figure 10:
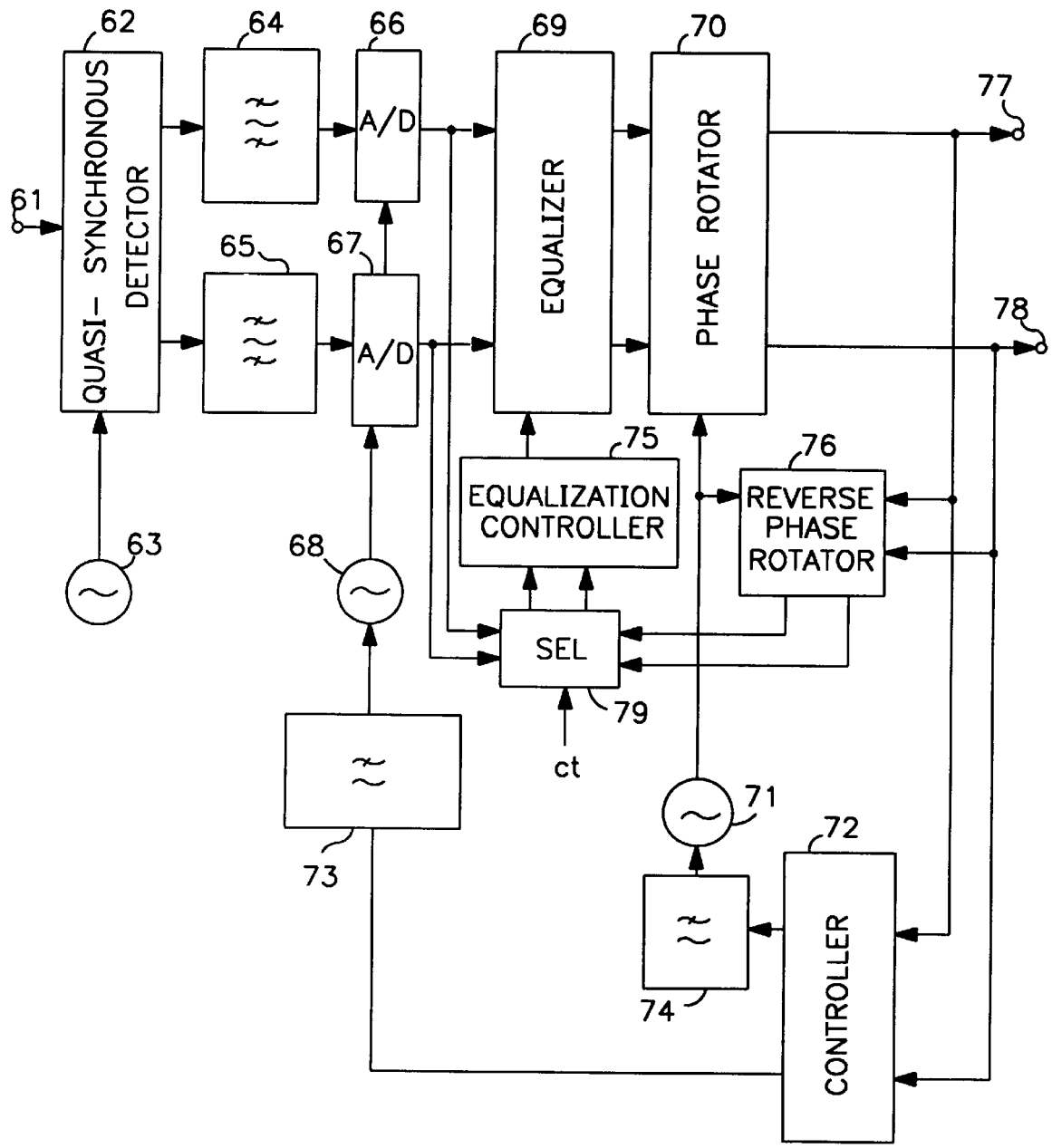
FIG. 10 is a schematic diagram of a demodulator according to another preferred embodiment of the present invention.

FIG. 10 is a schematic diagram of a demodulator according to another preferred embodiment of the present invention. In this figure, and as embodied herein, the demodulator includes: an input terminal 61, a quasi-synchronous detector 62, a local oscillator 63, band-pass filters 64 and 65, A/D converters 66 and 67, a constant-voltage clock oscillator 68, an equalizer 69, a phase rotator 70, a constant-voltage phase control signal oscillator 71, a controller 72, low-pass filters 73 and 74, an equalization controller 75, a reverse phase rotator 76, output terminals 77 and 78, and a selector (SEL) 79.

This demodulator has a configuration similar to that for the demodulator shown in FIG. 8, except that the selector 79 is incorporated therein. The configurations for the quasi-synchronous detector 62, phase rotator 70, controller 72, and reverse phase rotator 76 are not further explained here because they are similar to those shown in FIG. 8 and described earlier. The above selector 79 selects I-channel and Q-channel signals that are to be input into the equalizer 69 and those with phases rotated in reverse by the reverse phase rotator 76 in accordance with control signals (ct). The selected signals are input into the equalization controller 75.

In a synchronous pull-in state, the phase rotator 70 rotates the phases of I-channel and Q-channel signals in accordance with the phase fluctuations of carriers of the modulated quadrature input signals. The selector 79 selects I-channel and Q-channel signals whose phases are rotated in reverse by the reverse phase rotator 76 and inputs the selected signals into the equalization controller 75. In a sync loss state, the phase rotator 70 rotates the phases of the I-channel and Q-channel signals at high speed. Even when the reverse phase rotator 76 returns the phases to the original status, precision will be reduced. Therefore, the selector 79 selects I-channel and Q-channel signals that are to be input into the equalizer 69 for input into the equalization controller 75.

Therefore, the control signal (ct) for the selector 79 can be generated in accordance with the synchronous status (established or lost) judgment based on the bit error rate in the post-stage synchronization monitor omitted in the figure. Instead of the polarity bits and error signals of I-channel and Q-channel signals having phases rotating in reverse that cause a great degree of unpredictability in the pull-in process, those of input I-channel and Q-channel signals can be used to generate tap factors for controlling the equalizer 69 and increasing the pull-in speed.

Figure 11:
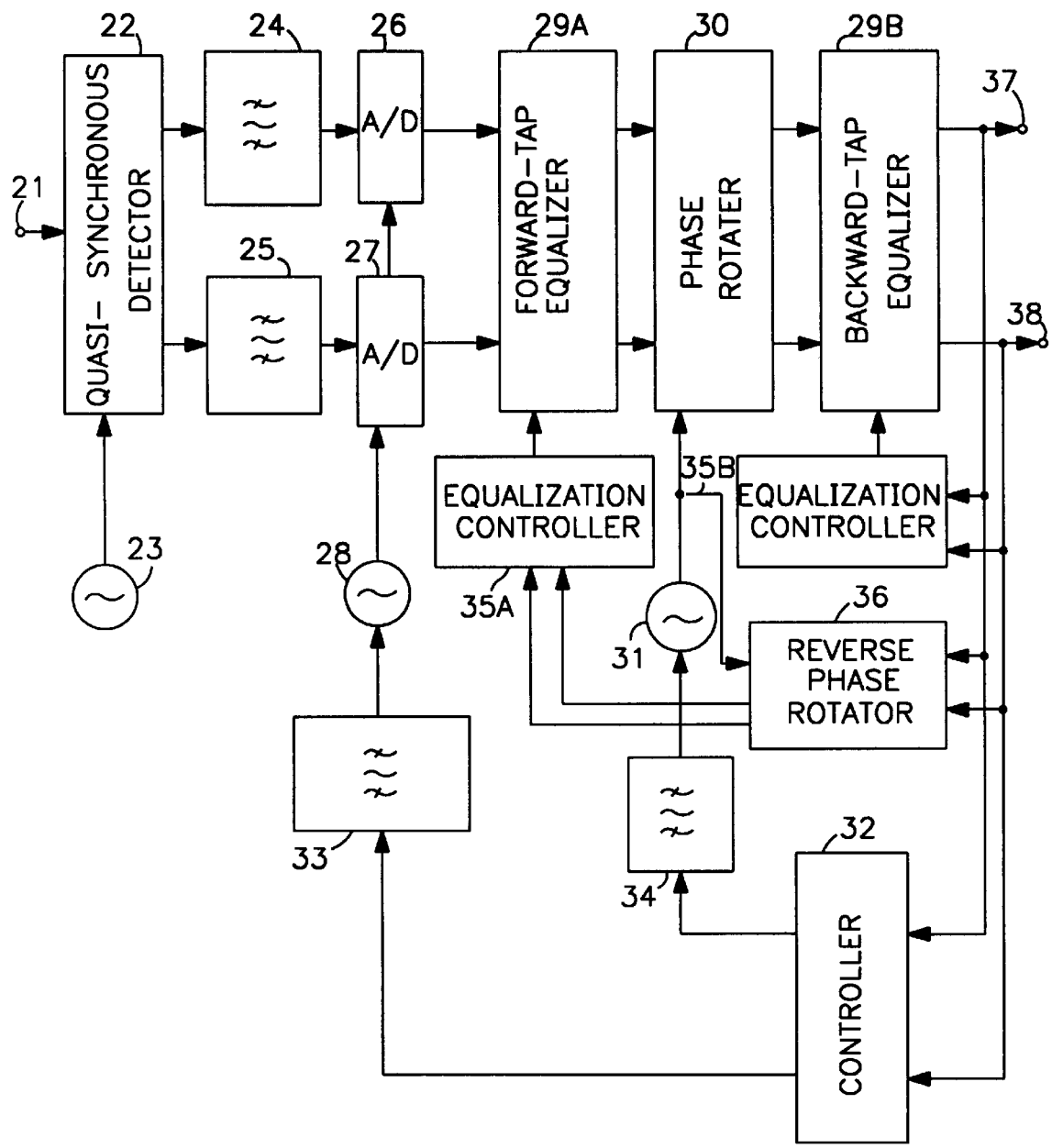
FIG. 11 is a schematic diagram of a demodulator according to another preferred embodiment of the present invention.

FIG. 11 is a schematic diagram of a demodulator according to another preferred embodiment of the present invention. In this figure, and as embodied herein, the demodulator includes: an input terminal 21, a quasi-synchronous detector 22, a local oscillator 23, band-pass filters 24 and 25, A/D converters 26 and 27, a constant-voltage clock oscillator 28, a forward-tap equalizer 29A, a backward-tap equalizer 29B, a phase rotator 30, a constant-voltage phase control signal oscillator 31, a controller 32, low-pass filters 33 and 34, equalization controllers 35A and 35B, a reverse phase rotator 36, and output terminals 37 and 38.

This demodulator has a configuration similar to that for the demodulator shown in FIG. 8, except that the equalizer 9 is separated into a forward-tap equalizer 29A corresponding to the prestage of the central taps and a backward-tap equalizer 29B corresponding to the post-stage of the central tap.

The forward-tap equalizer 29A is connected to the pre-stage of the phase rotator 30 and the backward-tap equalizer 29B is connected to the post-stage of the phase rotator 30. The I-channel and Q-channel signals having rotated phases are input into the equalization controller 35B for the backward-tap equalizer 29B. The signals are also input into the equalization controller 35A for the forward-tap equalizer 29A through the reverse phase rotator 36.

The I-channel and Q-channel signals phase-rotated by the phase rotator 30 and equalized by the backward-tap equalizer 29B are input into the equalization controller 35A after reverse phase rotation by the reverse phase rotator 36. Therefore, I-channel and Q-channel signals having the same phase as those input into the forward-tap equalizer 29A are input into the equalization controller 35A. This allows control of the forward-tap equalizer 29A to be unaffected by a phase rotation in the phase rotator 30 and enables stable equalization processing.

Figure 12:
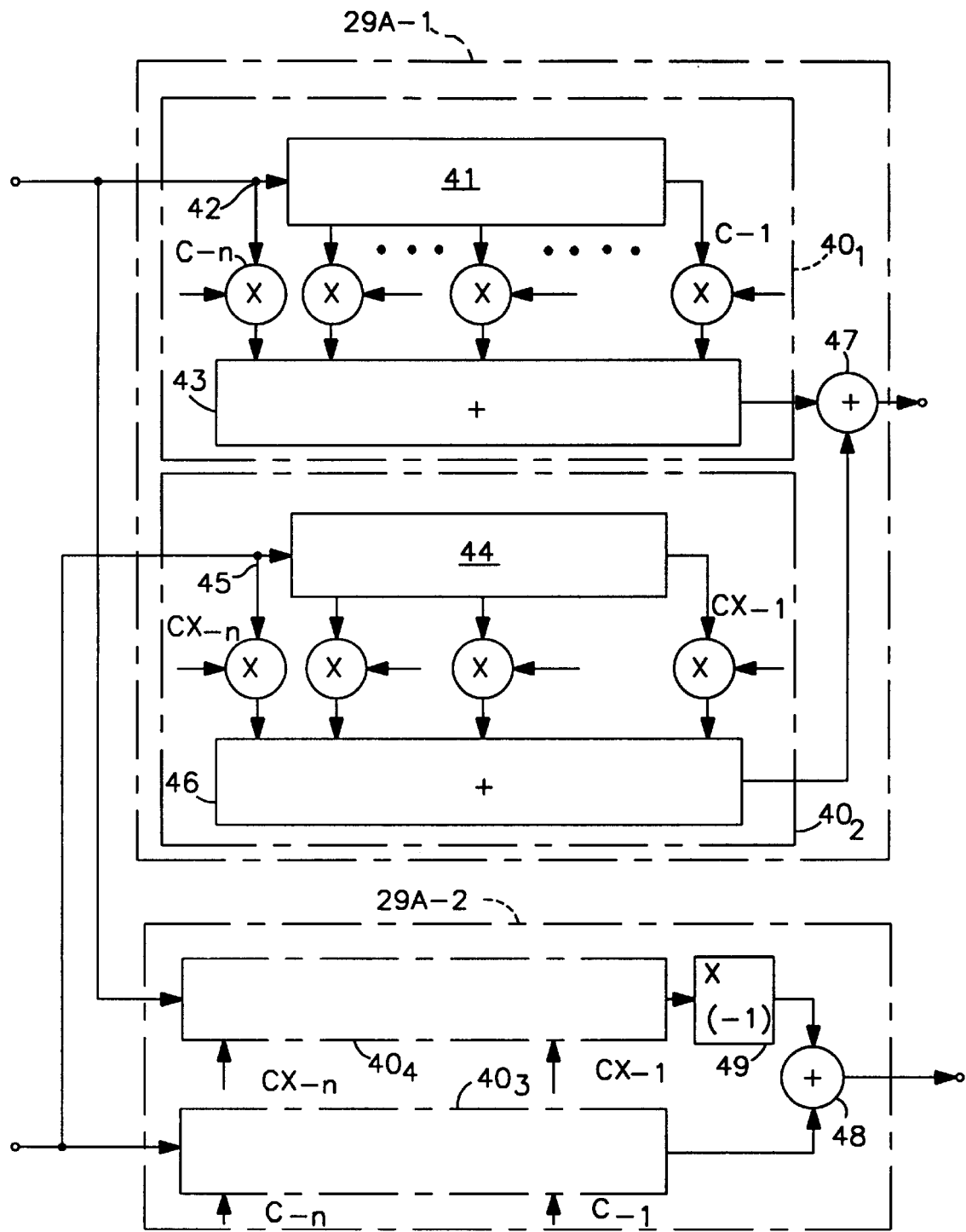
FIG. 12 is a schematic diagram of a forward-tap equalizer shown in FIG. 11 according to another preferred embodiment of the present invention.

FIG. 12 is a schematic diagram of the forward-tap equalizer 29A shown in FIG. 11 according to another preferred embodiment of the present invention. The forward-tap equalizer 29A shown in FIG. 11 includes an I-channel equalizer 29A-1 and a Q-channel equalizer 29A-2. I-channel equalizer 29A has tapped delay circuits 41 and 44 to which flip-flops are connected in cascade form; multipliers 44 and 45 connected to the taps; adders 43 and 46 for adding multiplied output signals; an adder 47; a common mode filter $40_1$; and a quadrature filter $40_2$. The Q-channel equalizer 29A-2 has a multiplier 49 for multiplying by −1, a common-mode filter $40_3$ and quadrature filter $40_4$. C−n to C−1 and CX−n to CX−1 represent the tap factors ahead of tap factor C0 of the central tap.

The tap factors from C−n to C−1 for adding to the common-mode filters $40_1$, $40_3$ in the I-channel and Q-channel equalizers 29A-1, 29A-2 are made common. The tap factors from CX−n to CX−1 for adding to the quadrature filters $40_2$, $40_4$ are also made common. In the I-channel equalizer 29A-1, the adder 47 adds the output signals from the common-mode filter $40_1$ and quadrature filter $40_2$ to generate an I-channel equalized output signal. With the common tap factors, the multiplier 49 multiplies the output signal from the quadrature filter $40_4$ in the Q-channel equalizer 29A-2 and inputs the product to the adder 48. The product is added to an output signal from the common-mode filter $40_3$ to generate a Q-channel equalized output signal.

Figure 13:
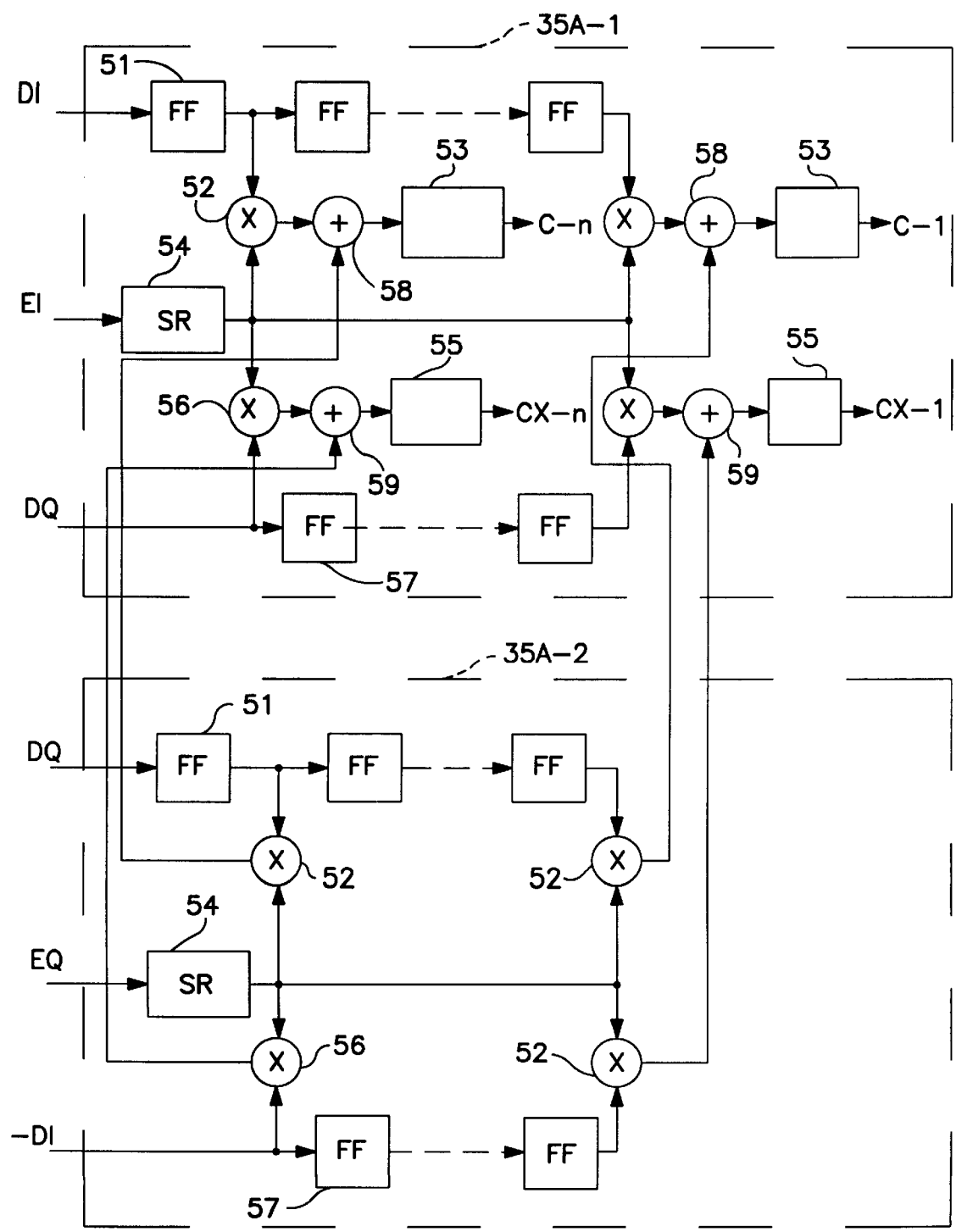
FIG. 13 is a schematic diagram of an equalization controller shown in FIG. 11 according to another preferred embodiment of the present invention.

FIG. 13 is schematic diagram of an equalization controller shown in FIG. 11 according to another preferred embodiment of the present invention. The equalization controller 35A shown in FIG. 11 is for the forward-tap equalizer 29A. In FIG. 13, elements 35A-1 and 35A-2 are I-channel and Q-channel equalization controllers. As illustrated, the controllers variously have flip-flops 51 and 57, multipliers 52 and 56, integrators 53 and 55, a shift register (SR) 54, and an adder 59. DI and DQ are the polarity bits of channels I and Q and EI and EQ are the error signals of the channels. C−1 to C−n and CX−1 to CX−n represent the common tap factors for the forward-tap equalizers 29A-1, 29A-2 of channels I and Q.

The equalization controllers 35A-1, 35A-2 for I and Q channels have almost the same configuration. Multiplied output signals from the multipliers 52, 56 of the equalization controllers 35A-1, 35A-2 are added by the adders 58, 59 and integrated by the integrators 53, 55, respectively. The common tap factors from C−n to C−1 and from CX−n to CX−1 are then output.

I-channel polarity bit DI, error signal EI, and Q-channel polarity bit DQ are input into the I-channel equalization controller 35A-1. Q-channel polarity bit DQ, error signal EQ, and I-channel polarity bit DQ with a negative sign (−1) are input into the Q-channel equalization controller 35A-2. A negative sign (−1) is multiplied to polarity bit DI to make common the tap factors from C−n to C−1 and from CX−n to CX−1. When inputting a signal that was output from the multiplier 56 into the adder 59, the signal can be multiplied by a negative sign (−1). However, doing this will make the operation process complicated.

If the tap factors are made simply common, the orthogonal directions indicated by the channels on the I and Q axes become opposite to one another. Therefore, polarity bit DI is input into the Q-channel equalization controller 35A-2 with a negative sign and the output signal from the quadrature filter $40_4$ of the forward-tap equalizer 29A-2 for the Q channel is multiplied by −1. The configuration of the equalizer 35A can be simplified by making the tap factors of the forward-tap equalizers 29A-1, 29A-2 for I and Q channels.

Figure 14:
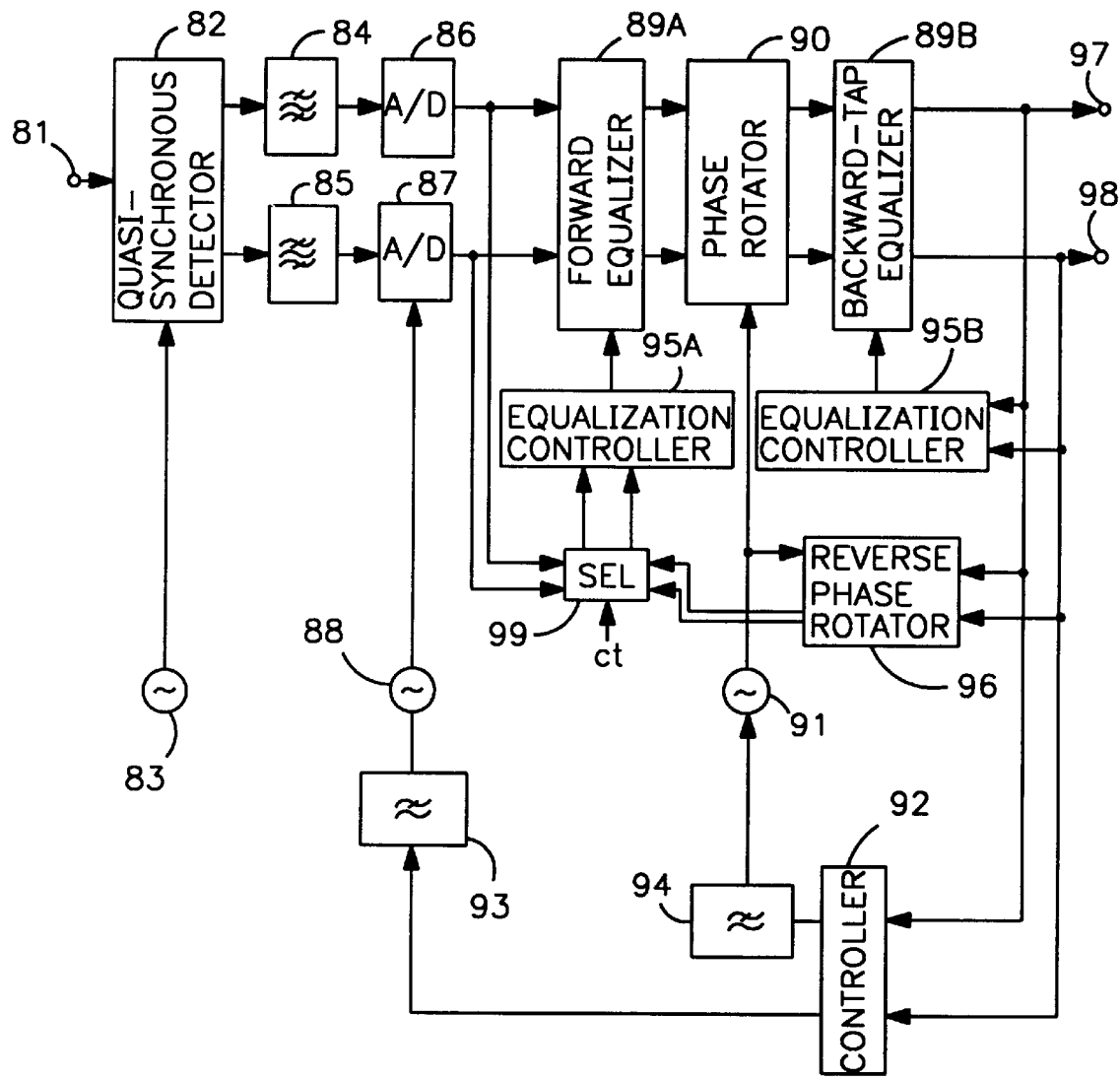
FIG. 14 is a diagram of a demodulator according to another preferred embodiment of the present invention.

FIG. 14 is a schematic diagram of a demodulator according to another preferred embodiment of the present invention. In this figure, and as embodied herein, the demodulator includes an input terminal 81, a quasi-synchronous detector 82, a local oscillator 83, band-pass filters 84 and 85, A/D converters 86 and 87, a constant-voltage controlled clock oscillator 88, a forward-tap equalizer 89A, a backward-tap equalizer 89B, a phase rotator 90, a constant-voltage phase control signal oscillator 91, a controller 92, low-pass filters 93 and 94, equalization controllers 95A and 95B, a reverse phase rotator 96, output terminals 97 and 98, and a selector (SEL) 99.

This demodulator has a configuration similar to that for the demodulator shown in FIG. 11, except that the selector 99 is added. The configuration for the quasi-synchronous detector 82, phase rotator 90, controller 92, and reverse phase rotator 96 are not explained here because they are similar to those shown in FIG. 11 and described earlier. As is the case with the selector 79 shown in FIG. 10, the above selector 99 selects I-channel and Q-channel signals that are to be input into the forward-tap equalizer 89A and those with phases rotated in reverse by the reverse phase rotator 96 in accordance with control signals (ct). The selected signals are input into the equalization controller 95A.

Instead of the polarity bits and error signals of I-channel and Q-channel signals having phases that rotate in reverse that cause a great degree of unpredictability in the pull-in process, those of input I-channel and Q-channel signals can be used to generate tap factors for controlling the forward-tap equalizer 89A and increasing the pull-in speed.

Figure 15:
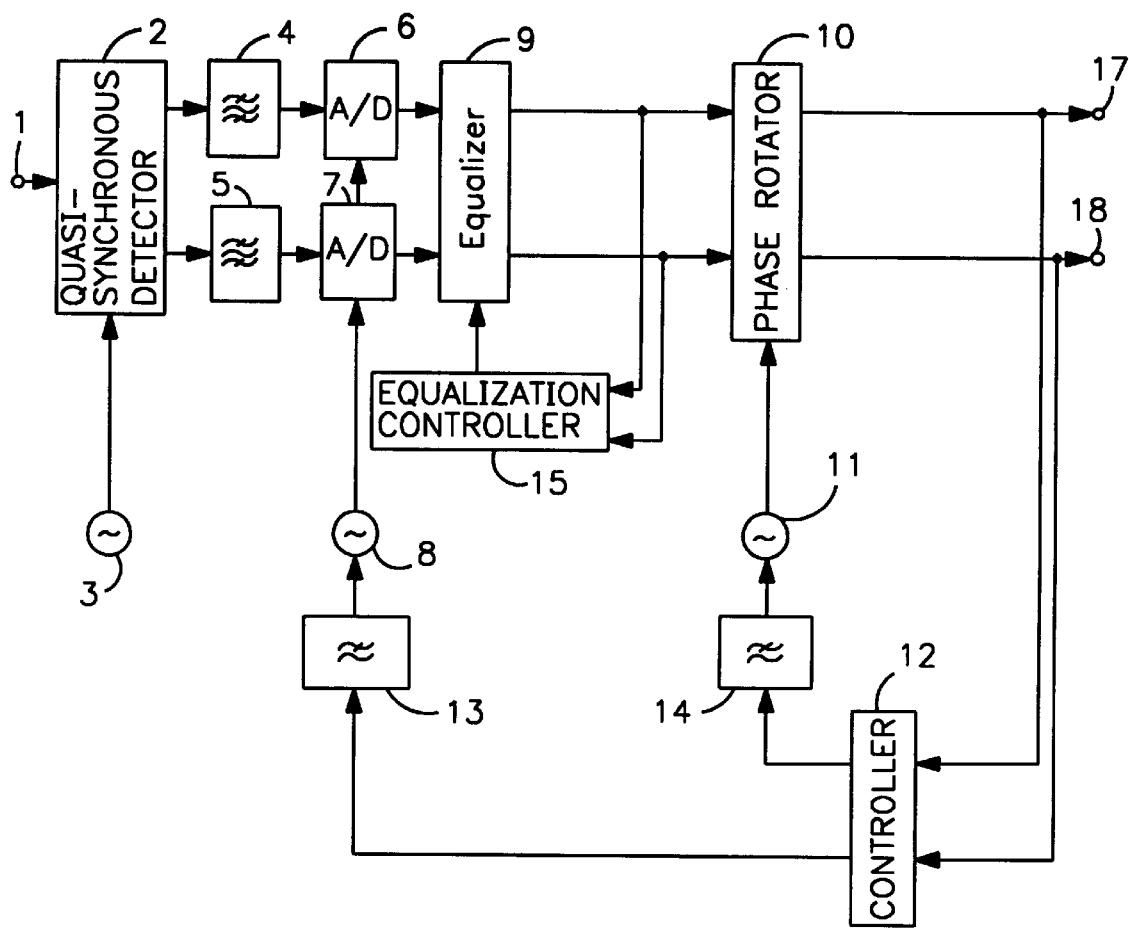
FIG. 15 is a schematic diagram of a demodulator according to another preferred embodiment of the present invention.

FIG. 15 is a schematic diagram of a demodulator according to another preferred embodiment of the present invention. In FIG. 15, and as embodied herein, the sections and elements of the demodulator equivalent to those of the demodulator in FIG. 8 have the same reference numbers. Their explanations have therefore been omitted. The I-channel and Q-channel signals output from the equalizer 9 and input into the phase rotator 10 are branched and input into the equalization controller 15. The equalization controller 15 generates tap factors for the equalizer 9 connected to the prestage of the phase rotator 10, using I-channel and Q-channel signals having the same phase as the I-channel and Q-channel signals input into the phase rotator 10. In other words, the I-channel and Q-channel signals having unreversed phases are used. Since the reverse phase rotator 16 shown in FIG. 8 is not necessary, the configuration for this embodiment of the demodulator can be simplified.

Figure 16:
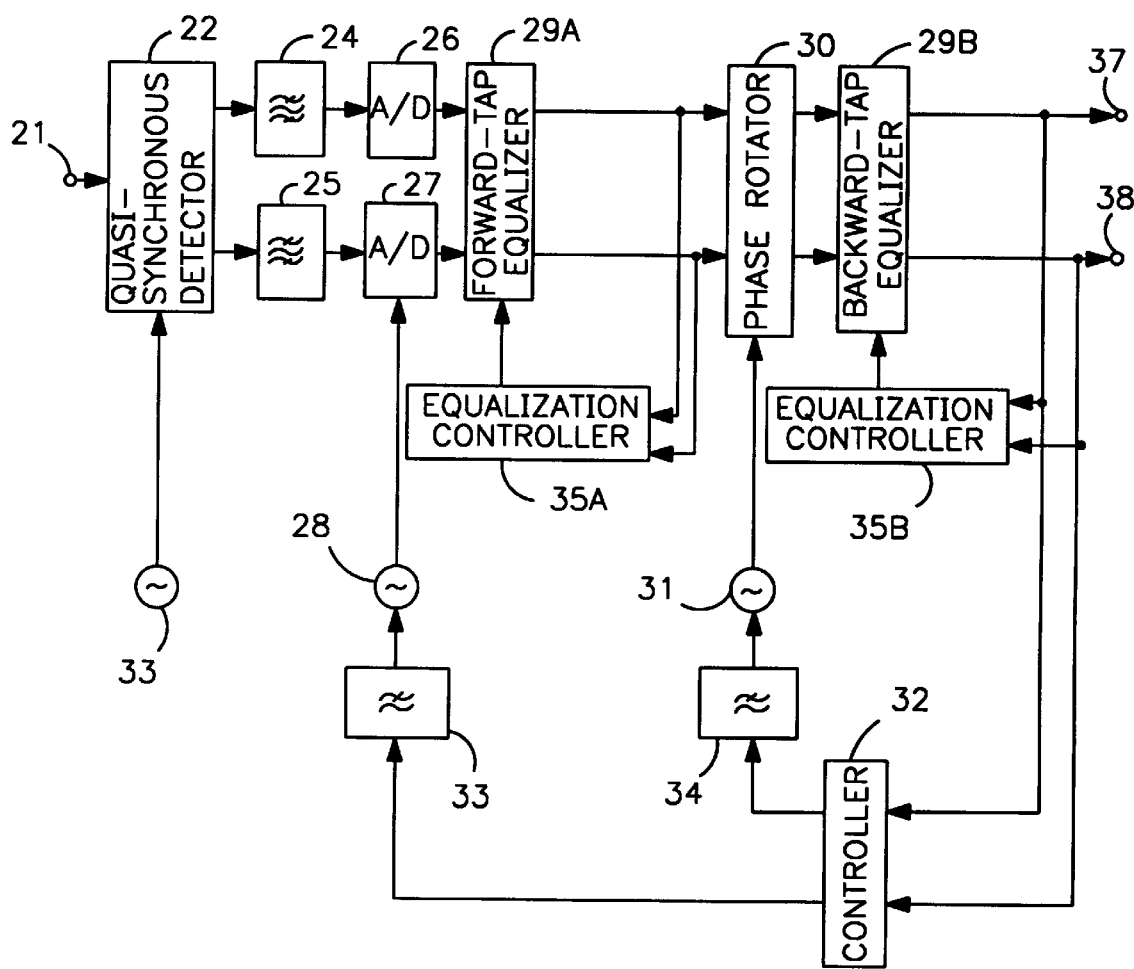
FIG. 16 is a schematic diagram of a demodulator according to another preferred embodiment of the invention.

FIG. 16 is a schematic diagram of a demodulator according to another preferred embodiment of the present invention. In FIG. 16, and as embodied herein, the sections and elements equivalent of the demodulator to those of the demodulator in FIG. 11 have the same numbers. Their explanations have therefore been omitted. The I-channel and Q-channel signals output from the forward-tap equalizer 29A and input into the phase rotator 30 are branched and input into the equalization controller 35A. The equalization controller 35A generates tap factors for the forward-tap equalizer 29A connected to the prestage of the phase rotator 30, using I-channel and Q-channel signals having the same phase relationship as the I-channel and Q-channel signals input into the phase rotator 30. In other words, the I-channel and Q-channel signals having unrotated phases are used. Since the reverse phase rotator 36 shown in FIG. 11 becomes unnecessary, the configuration for this embodiment of the demodulator can be simplified.

In accordance with embodiments of the invention as described above, the reverse phase rotator, such as rotator 16, is connected to the equalization controller, such as controller 15, which generates tap factors for the equalizer, such as equalizer 9, connected to the prestage of the phase rotator, such as rotator 10. The reverse phase rotator returns the quadrature channel signals having phases rotated by the phase rotator to their original phases and inputs the signals into the equalization controller. The equalization controller can then generate tap factors by using the polarity bits and error signals of the equalized output quadrature channel signals having the same phases as the input quadrature channel signals of the equalizer. Even when the carrier frequencies or phases of input quadrature channel signals fluctuate, a simple system configuration stabilizes the equalization operation.

In accordance with further embodiments of the invention as described above, the equalizer 9 is separated into a forward-tap equalizer, such as equalizer 29A, and a backward-tap equalizer, such as equalizer 29B. The forward-tap equalizer is connected to the prestage of the phase rotator, such as rotator 30, and the backward-tap equalizer is connected to the post-stage of the phase rotator. A reverse phase rotator, such as rotator 36, is then connected to the equalization controller, such as controller 35A, which generates tap factors for the forward-type equalizer. Accordingly, the equalization controller can generate tap factors from the polarity bits and error signals of equalized quadrature channel signals having the same phase as the quadrature channel signals input into the forward-tap equalizer. One advantage of these embodiments of the invention is that the equalizing processing can be stabilized using a relatively simple configuration.

By having common tap factors for the forward-tap equalizers of the quadrature channels (I and Q), it becomes possible to use a simple configuration for the equalization controller that generates the tap factors, which in turn leads to cost reductions.

Although a few preferred embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. A demodulator for demodulating an input signal using quasi-synchronous detection, the demodulator comprising:
a quasi-synchronous detector to detect a modulated quadrature input signal using an oscillated signal of a fixed frequency to thereby output a detected quadrature signal;

an equalizer to equalize a quadrature channel signal which is a digital signal converted from the detected quadrature signal output from said quasi-synchronous detector to thereby output an equalized quadrature channel signal;

a phase rotator to rotate the phase of the equalized quadrature channel signal output from said equalizer; and an equalization controller unit to generate a tap factor for said equalizer from the quadrature channel signal equalized by said equalizer, using a signal having a substantially same phase as input-output signals of the equalizer.

2. A demodulator according to claim 1, wherein said equalization controller unit comprises:
a reverse phase rotator to return the quadrature channel signal having a phase rotated by said phase rotator to an original phase of the equalized quadrature channel signal output; and an equalization controller to receive a quadrature channel signal output from said reverse phase rotator and to generate a tap factor for said equalizer.

3. A demodulator according to claim 1, further comprising a local oscillator connected to said quasi-synchronous detector to provide the quasi-synchronous detector with an oscillated signal of a fixed frequency.

4. A demodulator according to claim 2, wherein said reverse phase rotator returns the quadrature channel signal with the phase rotated by said phase rotator to the original phase in accordance with a control signal for said phase rotator.

5. A demodulator according to claim 2, further comprising a selector having as a first input said detected quadrature signal output which enters said equalizer and having as a second input the equalized quadrature channel signal output from said reverse phase rotator, selecting the first input until synchronous pull-in and the second input after synchronous pull-in, and outputting the selected first input or second input to said equalization controller.

6. A demodulator for demodulating an input signal containing an original phase using quasi-synchronous detection, the demodulator comprising:
a quasi-synchronous detector to detect a modulated quadrature input signal using an oscillated signal of a fixed frequency to thereby output a detected quadrature signal;

a forward-tap equalizer, having a tap group corresponding to a prestage of central taps, to equalize a quadrature channel signal which is a digital signal converted from the detected quadrature signal output from said quasi-synchronous detector to thereby output an equalized quadrature channel signal;

a phase rotator to rotate the phase of the equalized quadrature channel signal output from said forward-tap equalizer;

a backward-tap equalizer, having a tap group corresponding to a post-stage of central taps, to equalize the equalized quadrature channel signal output from said phase rotator;

an equalization control unit to generate a tap factor for the forward-tap equalizer from the quadrature channel signal equalized by said forward-tap equalizer, using a signal having a substantially same phase as input-output signals of said forward-tap equalizer; and a first equalization controller to receive a quadrature channel signal output from said backward-tap equalizer and to generate a tap factor for said backward-tap equalizer.

7. A demodulator according to claim 6, wherein said equalization control unit comprises:

a reverse phase rotator to return the quadrature channel signal having a phase rotated by said phase rotator to the original phase of said quadrature channel signal; and a second equalization controller to receive quadrature channel signal output from said reverse phase rotator and to generate a tap factor for said forward-tap equalizer.

8. A demodulator according to claim 6, further comprising a local oscillator connected to said quasi-synchronous detector to provide the quasi-synchronous detector with an oscillated signal of a fixed frequency.

9. A demodulator according to claim 7, wherein said reverse phase rotator returns the quadrature channel signal with the phase rotated by the phase rotator to the original phase in accordance with a control signal for said phase rotator.

10. A demodulator according to claim 7, further comprising said detected quadrature signal output comprising a first quadrative channel signal and a second quadrative channel signal;

a selector having as a first input both said first quadrative channel signal and said second quadrative channel signal which enter into said forward-tap equalizer and having as a second input the equalized quadrature channel signal output from said reverse phase rotator, selecting the first input until synchronous pull-in and the second input after synchronous pull-in, and outputting the selected first input or second input to said equalization controller.

11. A demodulator according to claim 6, wherein said forward-tap equalizer comprises:

quadrature-channel signal equalizing sections, each section including a common-mode filter and a quadrature filter and a quadrature channel signal;

a tap factor of the equalizing sections being made common for said quadrature channel signal; and a circuit to multiply an output signal from either section quadrature filter by −1, to add an output signal from the common-mode filter, and to generate a channel equalized output signal.

12. A demodulator according to claim 7, wherein said second equalization controller comprises:

a first equalization control section having inputs of a polarity bit and error signal of a first quadrature channel signal and a polarity bit of a second quadrature channel signal;

a second equalization control section having inputs of a polarity bit and error signal of said second quadrature channel signal and a polarity bit of said first quadrature channel signal multiplied by −1; and a circuit to add a tap factor by either the first equalization control section or the second equalization control section to a tap factor by a remaining equalization control section and to output an added signal as the tap factor for the forward-tap equalizer.

13. A demodulator according to claim 1, wherein said equalization controller unit receives a quadrature channel signal output from the equalizer and generates a tap factor for said equalizer.

14. A demodulator according to claim 6, wherein said equalization controller unit receives a quadrature channel signal output from said forward-tap equalizer and generates a tap factor for said forward-tap equalizer.

15. A demodulator for demodulating an input signal using quasi-synchronous detection, the demodulator comprising:

local oscillator means for generating an oscillated signal of a fixed frequency;

quasi-synchronous detecting means for detecting a modulated quadrature input signal using the oscillated signal of a fixed frequency of said local oscillator means which outputs a detected quadrature signal output;

equalizing means for equalizing a quadrature channel signal which is a digital signal converted from the detected quadrature signal output from said quasi-synchronous detecting means;

phase rotating means for rotating the phase of the equalized quadrature channel signal output from said equalizing means; and equalization control means for generating a tap factor for said equalizing means from the quadrature channel signal equalized by said equalizing means using a signal having a substantially same phase as input-output signals of said equalizing means.

16. A demodulator for demodulating an input signal using quasi-synchronous detection, the demodulator comprising:

local oscillator means for generating an oscillated signal of a fixed frequency;

quasi-synchronous detecting means for detecting a modulated quadrature input signal using the oscillated signal of a fixed frequency of said local oscillator means;

forward-tap equalizing means, having a tap group corresponding to a prestage of central taps, for equalizing a quadrature channel signal which is a digital signal converted from the detected signal output from said quasi-synchronous detecting means;

phase rotating means for rotating the phase of the equalized quadrature channel signal output from said forward-tap equalizing means which outputs a quadrature channel signal output;

backward-tap equalizing means, having a tap group corresponding to a post-stage of central taps, for equalizing the quadrature channel signal output from said phase rotating means;

first equalization control means for generating a tap factor for said forward-tap equaling means from the quadrature channel signal equalized by said forward-tap equalizing means using a signal having a substantially same phase as input-output signals of said forward-tap equalizing means; and second equalization control means for receiving the quadrature channel signal output from said backward-tap equalizing means and generating a tap factor for said backward-tap equalizing means.

17. A demodulator comprising:

an equalizer equalizing a quadrature channel signal in accordance with a tap factor, to thereby output an equalized quadrature channel signal;

a phase rotator rotating a phase of the equalized quadrature channel signal, to thereby output a first phase rotated signal;

a reverse phase rotator rotating the phase of the first phase rotated signal, to thereby output a second phase rotated signal; and an equalization controller generating the tap factor for the equalizer from the second phase rotated signal.

18. A demodulator as in claim 17, wherein the second phase rotated signal output from the reverse phase rotator has substantially the same phase as the equalized quadrature channel signal output from the equalizer.

19. A demodulator comprising:
- a forward-tap equalizer equalizing a quadrature channel signal in accordance with a forward tap factor, to thereby output an equalized quadrature channel signal;
- a phase rotator rotating a phase of the equalized quadrature channel signal, to thereby output a rotated signal;
- a backward-tap equalizer equalizing the rotated signal in accordance with a backward tap factor; and
- a tap factor generating structure generating the forward tap factor from the equalized quadrature channel signal using a signal having a substantially same phase as the equalized quadrature channel signal of said forward-tap equalizer and generating the backward tap factor.

20. A demodulator according to claim 19 wherein
said forward-tap equalizer has a tap group corresponding to a prestage of central taps; and
said backward-tap equalizer has a tap group corresponding to a post-stage of central taps.

21. A demodulator according to claim 19, wherein the tap factor generator generates the backward tap factor in accordance with the equalized rotated signal.

* * * * *